US011981264B2

(12) United States Patent
Rego et al.

(10) Patent No.: US 11,981,264 B2
(45) Date of Patent: May 14, 2024

(54) ELECTRONIC DEVICE HOLDER

(71) Applicant: Ford Global Technologies, LLC, Dearborn, MI (US)

(72) Inventors: Rafael Rego, Bloomfield Hills, MI (US); Tuan Quoc Nguyen, Birmingham, MI (US); Bradley Berner, Dearborn, MI (US); Michael Arbaugh, Rochester Hills, MI (US); Gary Vincent Morales, Northville, MI (US); Robert Charles Shipley, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 17/841,240

(22) Filed: Jun. 15, 2022

(65) Prior Publication Data

US 2023/0406222 A1    Dec. 21, 2023

(51) Int. Cl.
*B60R 11/02* (2006.01)
*F16B 2/12* (2006.01)
*B60R 11/00* (2006.01)

(52) U.S. Cl.
CPC ............... *B60R 11/02* (2013.01); *F16B 2/12* (2013.01); *B60R 2011/0012* (2013.01); *B60R 2011/0015* (2013.01); *B60R 2011/0071* (2013.01)

(58) Field of Classification Search
CPC ..... B60R 2011/0071; B60R 2011/0075; B60R 2011/0082; B60R 2011/0015; B60R 2011/0092; B60R 11/02; B60R 11/0241; B60R 7/043

See application file for complete search history.

(56) References Cited

U.S. PATENT DOCUMENTS

| | | | | |
|---|---|---|---|---|
| 7,537,190 B2 * | 5/2009 | Fan | ...................... | H04B 1/3877 |
| | | | | 379/426 |
| 8,567,737 B2 * | 10/2013 | Chen | .................... | H04B 1/3877 |
| | | | | 379/454 |
| 9,115,843 B2 * | 8/2015 | Huang | ................... | F16M 13/00 |
| 9,161,466 B2 * | 10/2015 | Huang | ................ | H05K 5/0208 |
| 9,233,649 B2 * | 1/2016 | Bisceglia | ............... | B60K 35/50 |
| 9,334,679 B2 * | 5/2016 | Lin | ......... | F16M 13/00 |
| 9,469,253 B2 * | 10/2016 | Brunard | .................. | B60R 11/02 |
| 9,749,002 B1 * | 8/2017 | Fan | .......... | H04M 1/04 |

(Continued)

FOREIGN PATENT DOCUMENTS

DE    102005042914 B4 *    3/2013    ............. B60R 7/043

*Primary Examiner* — Justin M Larson
(74) *Attorney, Agent, or Firm* — Vichit Chea; Price Heneveld LLP

(57) ABSTRACT

A device holder assembly that includes a body and a housing coupled to the body. A drive assembly is rotatably coupled to the housing. A leg assembly that includes a first leg and a second leg is coupled to the housing. A first rack gear is coupled to the first leg and the drive assembly. A second rack gear is coupled to the second leg and the drive assembly. The drive assembly permits instantaneous movement of the first leg and the second leg. A first finger is rotatably coupled to the first leg and a second finger is coupled to the second leg. The first finger has a first finger outer surface and the second finger has a second finger outer surface that are generally coplanar with the body outer surface when the first finger and the second finger are in a retracted position.

19 Claims, 7 Drawing Sheets

(56) References Cited

U.S. PATENT DOCUMENTS

| | | | |
|---|---|---|---|
| 9,776,722 B2 | 10/2017 | Pozzi et al. | |
| 10,001,153 B1* | 6/2018 | Fan | F16M 13/00 |
| 10,029,793 B2 | 7/2018 | Pozzi et al. | |
| 10,220,796 B2 | 3/2019 | Neumann et al. | |
| 10,414,500 B2 | 9/2019 | Irons et al. | |
| 10,569,719 B2* | 2/2020 | Yamada | B60R 11/0252 |
| 10,648,493 B1* | 5/2020 | Liao | F16B 2/12 |
| 10,926,877 B1* | 2/2021 | Puglisi | B64D 11/0627 |
| 11,122,917 B2* | 9/2021 | Chapuis | F16M 11/041 |
| 11,363,895 B2* | 6/2022 | Schuft | A47F 7/0246 |
| 11,686,430 B2* | 6/2023 | Wang | H04M 1/04 |
| | | | 248/467 |
| 2012/0120626 A1 | 5/2012 | Akaike | |
| 2013/0240587 A1* | 9/2013 | Buchhalter | B60R 11/0241 |
| | | | 224/570 |
| 2018/0065567 A1 | 3/2018 | Osterhoff et al. | |
| 2018/0222400 A1* | 8/2018 | Neumann | B60R 7/043 |
| 2023/0406222 A1* | 12/2023 | Rego | B60R 11/02 |

* cited by examiner

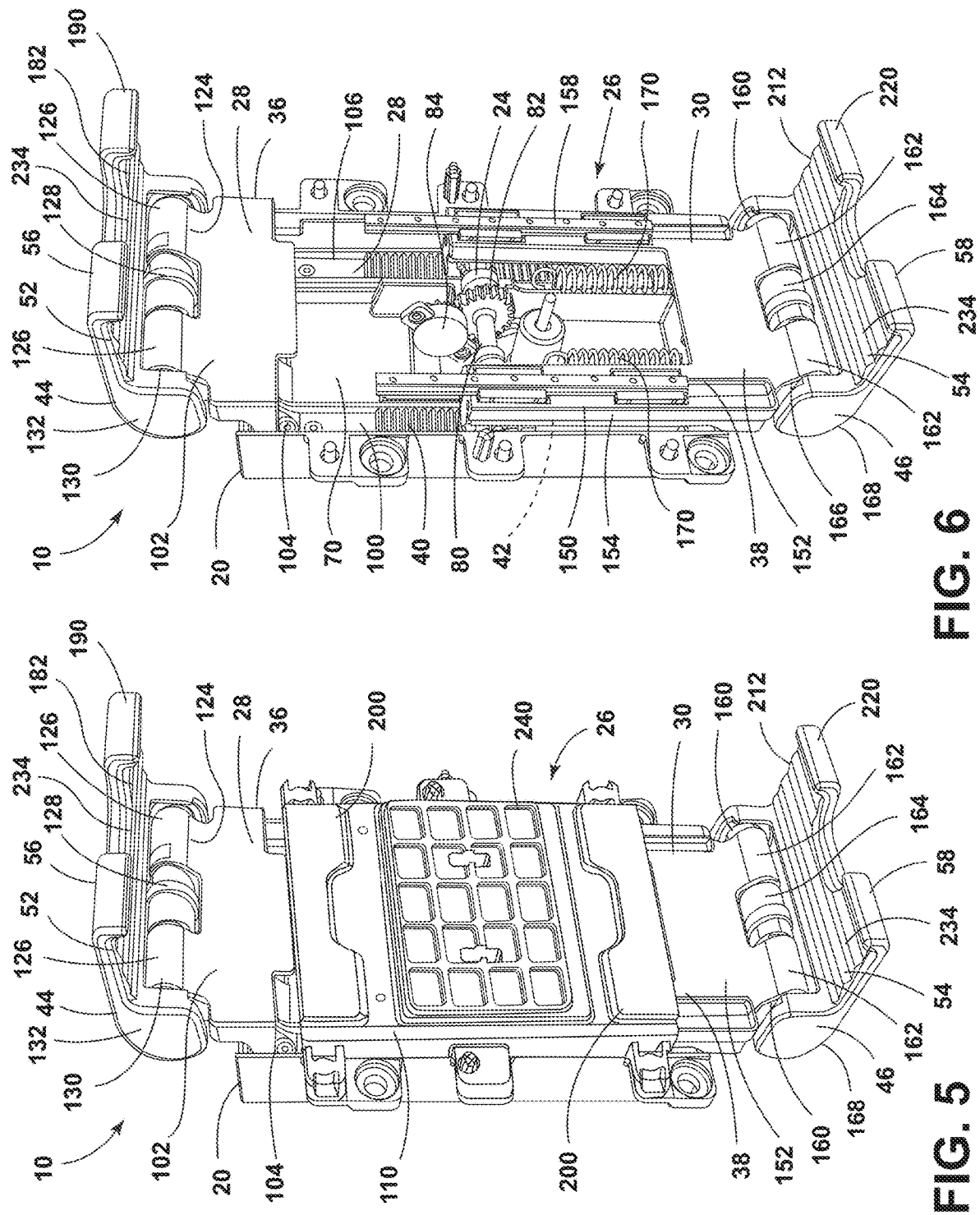

ELECTRONIC DEVICE HOLDER

FIELD OF THE DISCLOSURE

The present disclosure generally relates to a device holder assembly, in particular a device holder assembly that is used in a vehicle.

BACKGROUND OF THE DISCLOSURE

Electronic devices are commonly brought into motor vehicles. Some electronic devices are held by passengers in a vehicle while other electronic devices are stored in the vehicle. The stored electronic devices are typically either located in compartments of the vehicle where the device may be unfixed but accessible, fixed but inaccessible by passengers, or fixed to a bulky housing for use. However, such accessibility of devices not held by passengers may prevent interactive, interior space-saving use of the electronic devices.

SUMMARY OF THE DISCLOSURE

According to a first aspect of the present disclosure, the present invention relates to a device holder assembly that includes a body, a housing, a drive assembly, and a leg assembly. The body has an outer surface and the housing is coupled to the body. The drive assembly is rotatably coupled to the housing. The leg assembly is also coupled to the housing and comprises a first leg and a second leg that are movable between a recessed position and an extended position. A first rack gear is coupled to the first leg and is mechanically coupled to the drive assembly. A second rack gear is coupled to the second leg and is also mechanically coupled to the drive assembly. The coupling between the first rack gear and the drive assembly and the second rack gear and the drive assembly permits movement of either the first leg or the second leg to the extended position as the other of the first leg or the second leg is translated to the extended position. A first finger is rotatably coupled to an end of the first leg and a second finger is rotatably coupled to an end of the second leg. The first finger and the second finger are movable between a retracted position and a deployed position. The first finger has a first finger outer surface and the second finger outer surface that are generally coplanar with the body outer surface when the first finger and the second finger are in the retracted position.

Embodiments of the first aspect of the present disclosure can include any one or a combination of the following features:
  the drive assembly further comprises: a drive shaft, a first gear coupled to the drive shaft, a damper having a second gear, the second gear being mechanically coupled to the first gear, a third gear coupled to an end of the drive shaft, and a fourth gear coupled to an opposing end of the drive shaft;
  the first leg and the second leg linearly translate from the recessed position to the extended position;
  a first finger damper is coupled to the first finger and a second finger damper is coupled to the second finger;
  a first finger spring is coupled to the first finger and a second finger spring is coupled to the second finger, wherein the first finger spring provides a biasing force that pulls the first finger toward the retracted position of the first finger, and wherein the second finger spring provides a biasing force that pulls the second finger toward the retracted position of the second finger;
  the first leg comprises a first leg upper portion that is coupled to a first leg end segment that includes a pair of first finger engagement members, and wherein the pair of first finger engagement members have a generally semi-circular shape, and wherein the second leg comprises a second leg upper portion that is coupled to a second leg end segment that includes a pair of second finger engagement members, the pair of second finger engagement members having a generally semi-circular shape;
  the pair of first finger engagement members are rotatably coupled to the first finger and the pair of second finger engagement members are rotatably coupled to the second finger;
  the first leg upper portion generally intersects with a first leg lower portion at a first leg portion corner, wherein the first leg upper portion is elevated from the first leg lower portion;
  a housing cover coupled to a front section of the housing; and
  a first finger lip at an end of the first finger and a second finger lip at an end of the second finger, wherein the first finger lip and the second finger lip provide a retaining force at least partially sufficient to secure a device when the first finger and the second finger are in the deployed position, and wherein the first finger lip and the second finger lip engage a retaining element that is disposed on the housing cover when the first finger and the second finger are in the retracted position and the first leg and the second leg are in the recessed position.

According to a second aspect of the present disclosure, the present invention relates to a device holder assembly that includes a body, a housing, a bridge, a housing cover, a drive assembly, and a leg assembly. The body has an outer surface and the housing is recessed into and coupled to the body. The bridge is integrally formed from the body and extends over a width of the housing. The housing cover is coupled to a front section of the housing and includes a retaining element disposed on a front surface of the housing cover. The drive assembly is rotatably coupled to the housing. The leg assembly is also coupled to the housing and comprises a first leg and a second leg that are movable between a recessed position and an extended position. A first rack gear is coupled to the first leg and is mechanically coupled to the drive assembly. A second rack gear is coupled to the second leg and is also mechanically coupled to the drive assembly. The coupling between the first rack gear and the drive assembly and the second rack gear and the drive assembly permits movement of either the first leg or the second leg to the extended position as the other of the first leg or the second leg is translated to the extended position. A first finger is rotatably coupled to an end of the first leg and a second finger is rotatably coupled to an end of the second leg. The first finger and the second finger are movable between a retracted position and a deployed position. The first finger has a first finger outer surface and the second finger outer surface that are generally coplanar with the body outer surface when the first finger and the second finger are in the retracted position.

Embodiments of the second aspect of the present disclosure can include any one or a combination of the following features:
  the drive assembly further comprises: a drive shaft, a first gear coupled to the drive shaft, a damper having a second gear, the second gear being mechanically coupled to the first gear, a third gear coupled to an end of the drive shaft, and a fourth gear coupled to an opposing end of the drive shaft;

the first leg and the second leg linearly translate from the recessed position to the extended position;

a first dinger damper is coupled to the first finger and a second finger damper is coupled to the second finger;

a first finger spring is coupled to the first finger and a second finger spring is coupled to the second finger, wherein the first finger spring provides a biasing force that pulls the first finger toward the retracted position of the first finger, and wherein the second finger spring provides a biasing force that pulls the second finger toward the retracted position of the second finger;

the first leg comprises a first leg end segment that includes a pair of first finger engagement members that are rotatably coupled to the first finger and the second leg comprises a second leg end segment that includes a pair of second finger engagement members that are rotatably coupled to the second finger, wherein the pair of first finger engagement members have a generally semi-circular shape and the pair of second finger engagement members have a generally semi-circular shape; and a first hinge cover is coupled to the pair of first finger engagement members and a second hinge cover is coupled to the pair of second finger engagement members, wherein the first hinge cover has a first hinge cover arc that is generally parallel with a first finger engagement member arc of the pair of first finger engagement members and the second hinge cover has a second hinge cover arc that is generally parallel with a second finger engagement member arc of the pair of second finger engagement members.

According to a third aspect of the present disclosure, the present invention relates to a device holder assembly that includes a vehicle seat rear portion, a housing, a bridge, a housing cover, a drive assembly, and a leg assembly. The vehicle seat rear portion has a body outer surface and the housing is recessed into and coupled to the vehicle seat rear portion. The bridge is integrally formed from the vehicle seat rear portion and extends over a width of the housing. The housing cover is coupled to a front section of the housing and includes a retaining element disposed on a front surface of the housing cover. The drive assembly is rotatably coupled to the housing. The leg assembly is also coupled to the housing and comprises a first leg and a second leg that are movable between a recessed position and an extended position. A first rack gear is coupled to the first leg and is mechanically coupled to the drive assembly. A second rack gear is coupled to the second leg and is also mechanically coupled to the drive assembly. The coupling between the first rack gear and the drive assembly and the second rack gear and the drive assembly permits movement of either the first leg or the second leg to the extended position as the other of the first leg or the second leg is translated to the extended position. A first finger is rotatably coupled to an end of the first leg and a second finger is rotatably coupled to an end of the second leg. The first finger and the second finger are movable between a retracted position and a deployed position. The first finger has a first finger outer surface and the second finger outer surface that are generally coplanar with the body outer surface when the first finger and the second finger are in the retracted position. a first finger lip at an end of the first finger and a second finger lip at an end of the second finger, wherein the first finger lip and the second finger lip provide a retaining force at least partially sufficient to secure a device when the first finger and the second finger are in the deployed position, and wherein the first finger lip and the second finger lip engage the retaining element when the first finger and the second finger are in the retracted position and the first leg and the second leg are in the recessed position.

Embodiments of a third aspect of the present disclosure can include any one or a combination of the following features:

the first leg and the second leg linearly translate from the recessed position to the extended position; and a first finger damper is coupled to the first finger and a second finger damper is coupled to the second finger.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a perspective view of the device holder assembly in the use position, according to one example;

FIG. 6 is a partial perspective view of the device holder assembly of FIG. 5 in the use position, according to one example;

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
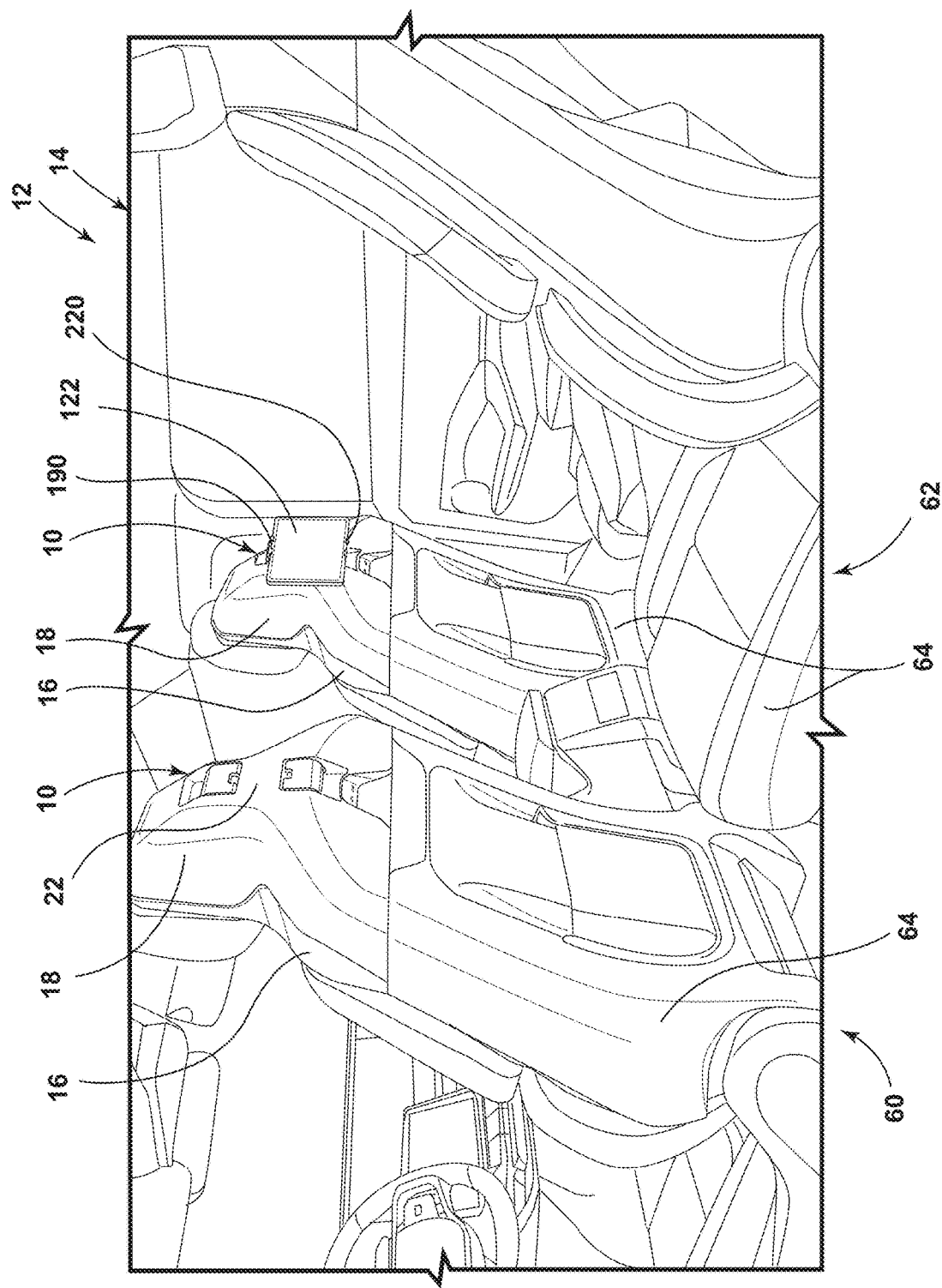
FIG. 1 is a side perspective view of a passenger compartment of a vehicle having vehicle seats equipped with device holder assemblies, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a device holder assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-11, depicted is a vehicle interior 12 with a passenger compartment 14 that includes one or more device holder assemblies 10. The device holder assembly 10 includes a body 16 having a body outer surface 18 and a housing 20 recessed into the body 16 and coupled to the body 16. A bridge 22 extends over a width of the housing 20 and is integrally formed from the body 16. A drive assembly 24 is rotatably coupled to the housing 20. A leg assembly 26 that includes a first leg 28 and a second leg 30 is coupled to the housing 20. The first leg 28 and the second leg 30 are operable between a recessed position 32, 34 and an extended position 36, 38. A first rack gear 40 is coupled to the first leg 28 and is in mechanical communication with the drive assembly 24. A second rack gear 42 is coupled to the second leg 30 and is in mechanical communication with the drive assembly 24. The coupling between the first rack gear 40 and the drive assembly 24 and the coupling between the second rack gear 42 and the drive assembly 24 permits movement of either the first leg 28 or the second leg 30 to the extended position 36, 38 as the other of the first leg 28 or the second leg 30 is translated to the extended position 36, 38. A first finger 44 is rotatably coupled to an end of the first leg 28 and a second finger 46 is rotatably coupled to an end of the second leg 30. The first finger 44 and the second finger 46 are movable between a retracted position 48, 50 and a deployed position 52, 54. The first finger 44 has a first finger outer surface 56 and the second finger 46 has a second finger outer surface 58 that are generally coplanar with the body outer surface 18 when the first finger 44 and the second finger 46 are in the retracted position 48, 50.

Figure 2:
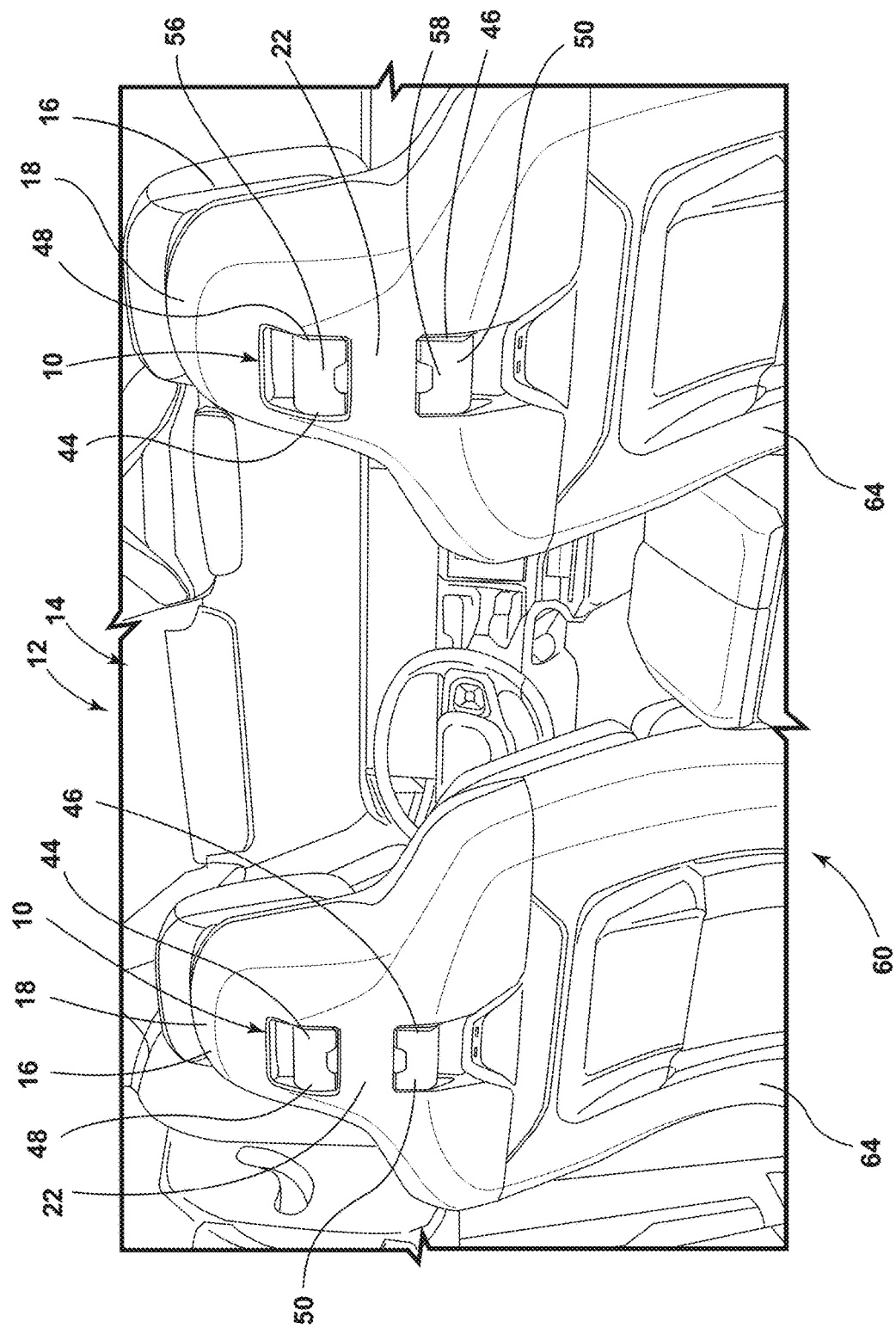
FIG. 2. is a side perspective view of a passenger compartment having vehicle seats equipped with device holder assemblies with one device holder assembly retaining a device.

Referring now to FIGS. 1 and 2, the vehicle interior 12 includes a passenger compartment 14 there within contained within a vehicle body. The passenger compartment 14 may include a first seating row 60 and a second seating row 62. Fewer or more seating rows may be included in the passenger compartment 14 without departing from the teachings herein. The first seating row 60 may be a front seating row 60 that includes a driver seat with a headrest and a passenger seat with a headrest. The second seating row 62 may include rear passenger seats. The rear passenger seats may include bucket seating or may be bench seating. As illustrated, the rear seating row 62 is bucket seating that includes a first rear passenger seat and a second rear passenger seat. The device holder assembly 10, as illustrated in FIGS. 1 and 2, may be disposed on a rear portion of the front seating row 60, such as a rear portion of the driver seat headrest and a rear portion of the passenger seat headrest. In FIG. 2, one device holder assembly 10 is in a non-use condition and the other device holder assembly 10 is in a use condition.

While the passenger compartment 14, as illustrated in FIGS. 1 and 2, has the device holder assemblies 10 disposed on a rear portion 66 of the front seating row 60, it is contemplated that the device holder assembly 10 may be positioned in any practicable location within the passenger compartment 14 of the vehicle interior 12 without departing from the teachings herein.

In various examples, the passenger compartment 14 is a passenger compartment 14 that may be within the vehicle interior 12 of a sedan, a sport utility vehicle, a truck, a van, a crossover, and/or other styles of vehicle. The passenger compartment 14 may be within the vehicle interior 12 of a manually operated vehicle (e.g., with a human driver), a fully autonomous vehicle (e.g., no human driver), or a partially autonomous vehicle (e.g., may be operated with or without a human driver).

Referring to FIGS. 1 and 2, the device holder assembly 10 includes a body 16 disposed in the passenger compartment 14. In some embodiments, the body 16 may include a body outer surface 18 that encompasses an outside periphery of the body 16 and a bridge 22 extending over the housing 20. As illustrated in FIGS. 1 and 2, the body outer surface 18 may be at least a portion of an outside periphery of the vehicle seat 64. In various embodiments, the body 16 may be the passenger seat 64 of the vehicle or a portion of the passenger seat 64. For example, the body 16 could be a seat headrest or a rear portion 66 of the vehicle seat 64. In yet other embodiments, the body 16 may be a vehicle center console, an instrument panel, or other portion of the vehicle seat 64. Additionally or alternatively, it is generally contemplated that the body 16 may be defined as numerous bodies in a vehicle, so long as the body 16 may operably couple and support the housing 20 and additional components, as provided further herein.

Referring to FIGS. 3-7, the device holder assembly 10 includes the housing 20 coupled to the body 16. In some embodiments, the housing 20 may has a generally rectangular shape and includes a housing rear portion 70, wherein the housing rear portion 70 may be distal from the body outer surface 18 such that the housing rear portion 70 is generally recessed into the body 16 and away from the body outer surface 18. In yet other embodiments, the housing 20 may be coupled to the body 16 such that the housing rear portion 70 is generally recessed into the body 16 and the bridge 22 covers a portion of the housing 20. For example, the housing 20 may be coupled to the body 16 such that the housing rear portion 70 is recessed into the body 16 and the bridge 22 extends over a central portion of the housing 20, as illustrated in FIGS. 1 and 2. The housing 20 is generally configured to operably house additional components of the device holder assembly 10. For example, the first leg 28 the second leg 30, and the drive assembly 24 may be stored in the housing 20. Additionally or alternatively, it is contemplated that the housing 20 may have any practical shape, so long as the housing 20 may operably contain additional components of the device holder assembly 10.

Figure 4:
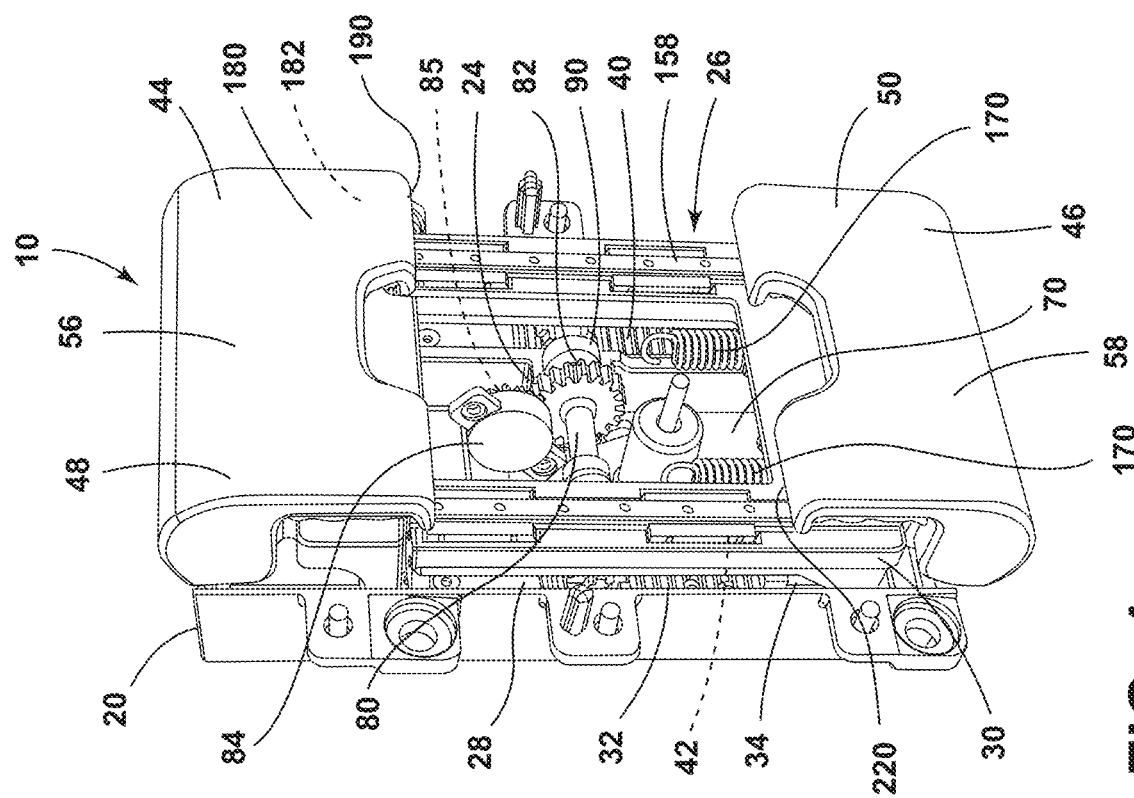
FIG. 4 is a partial perspective view of the device holder assembly of FIG. 3 in the non-use position, according to one example.
Figure 3:
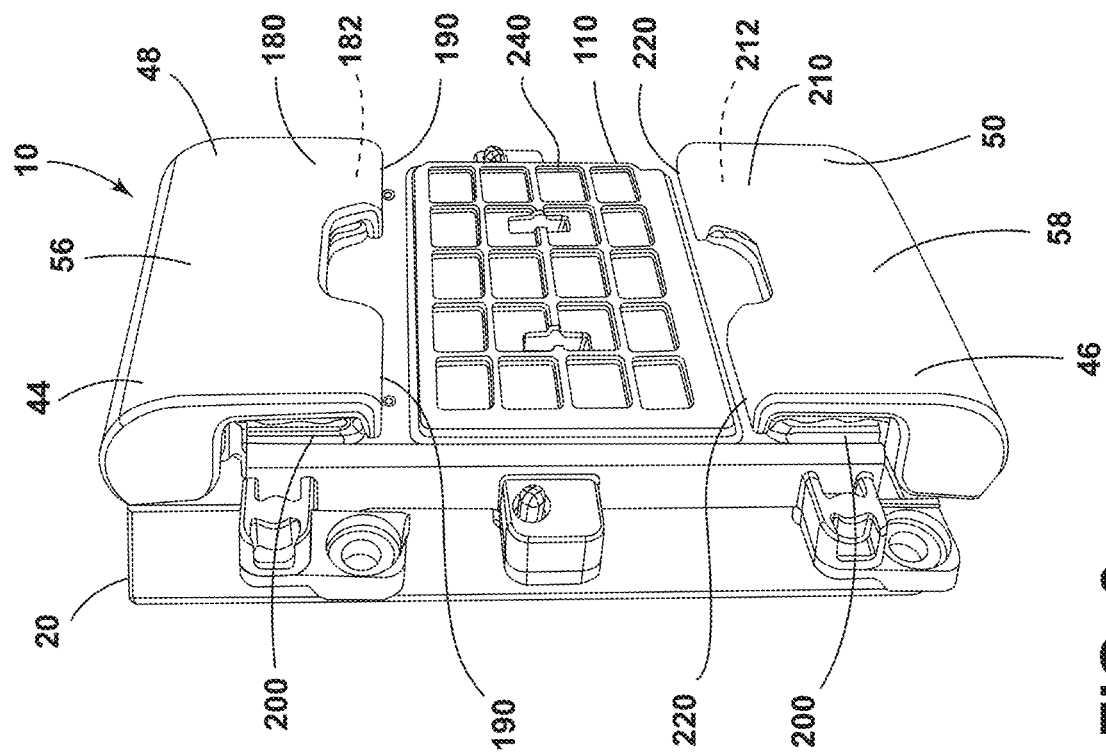
FIG. 3 is a perspective view of the device holder assembly in the non-use position, according to one example.

Referring to FIGS. 3-8, the device holder assembly 10 includes the drive assembly 24 coupled to the housing 20. As illustrated in FIGS. 4, 6, the drive assembly 24 may be rotatably coupled to a central portion of the housing 20 and may engage with the first leg 28 and the second leg 30, as provided further herein. The drive assembly 24 may further comprise the drive shaft 80 and the first gear 82 coupled to the drive shaft 80. The drive shaft 80 may be comprised of a metal, plastic, composite, or other suitable material and may extend along a width of the housing 20. The first gear 82 may be a spur gear or helical gear and may be comprised of a metal, plastic, composite or other suitable material and may be coupled at a position along the length of the drive shaft 80. In some embodiments, the first gear 82 may be integrally coupled to the drive shaft 80. For example, the drive shaft 80 and the first gear 82 may be both comprised of a same acetal or nylon plastic. The drive assembly 24 limits translation and permits rotational movement and mechanical communication between the first gear 82, a damper 84, a third gear 86, and a fourth gear 88, as provided herein. In some configurations, the first gear 82 is configured to couple with the damper 84. For example, the first gear 82 may be a spur gear that has a plurality of first gear 82 teeth that are in line contact with a second gear 85 of the damper 84, the second gear 85 likewise being a spur gear.

Figure 7:
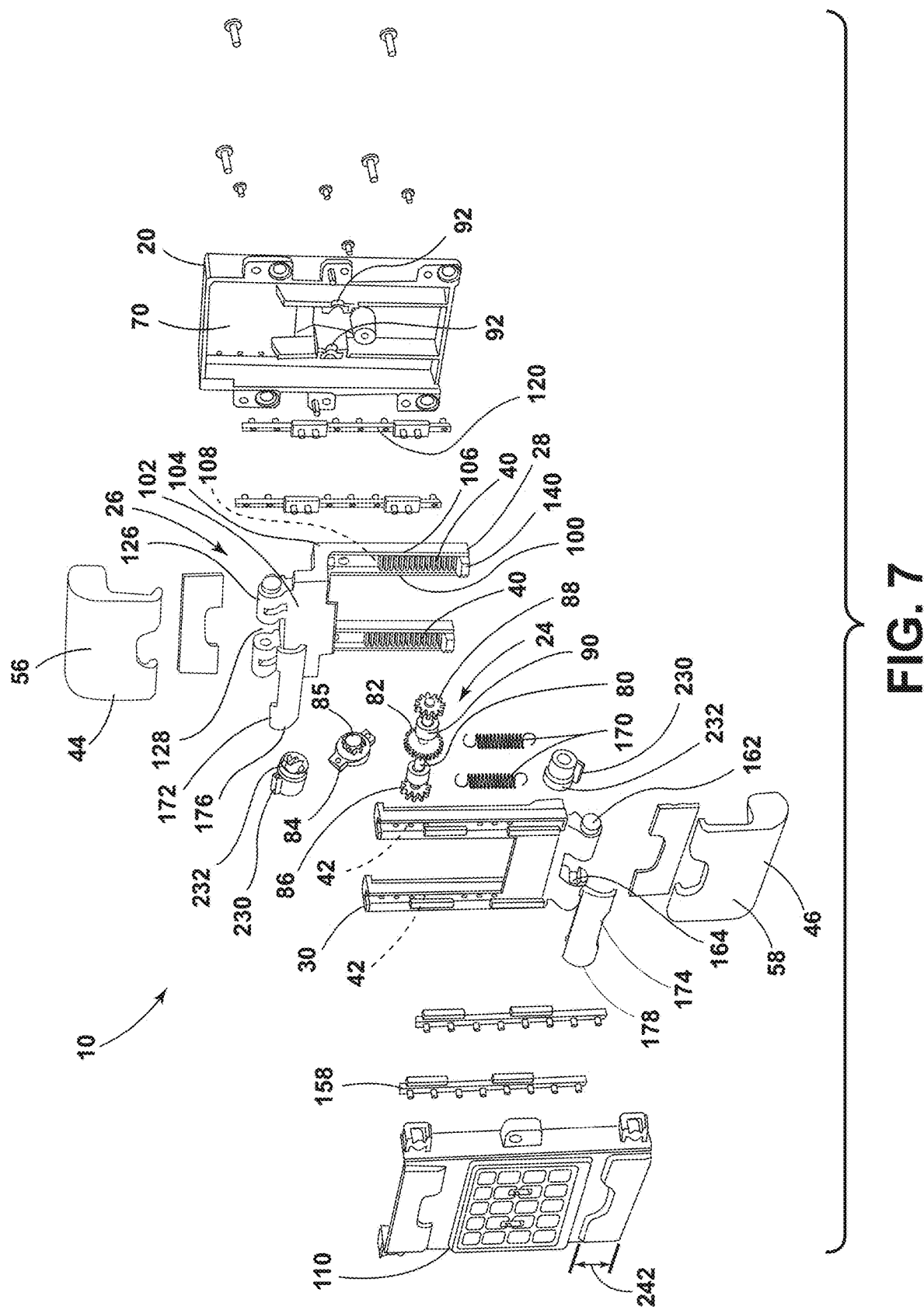
FIG. 7 is an exploded, perspective view of the device holder assembly, according to one example.
Figure 8:
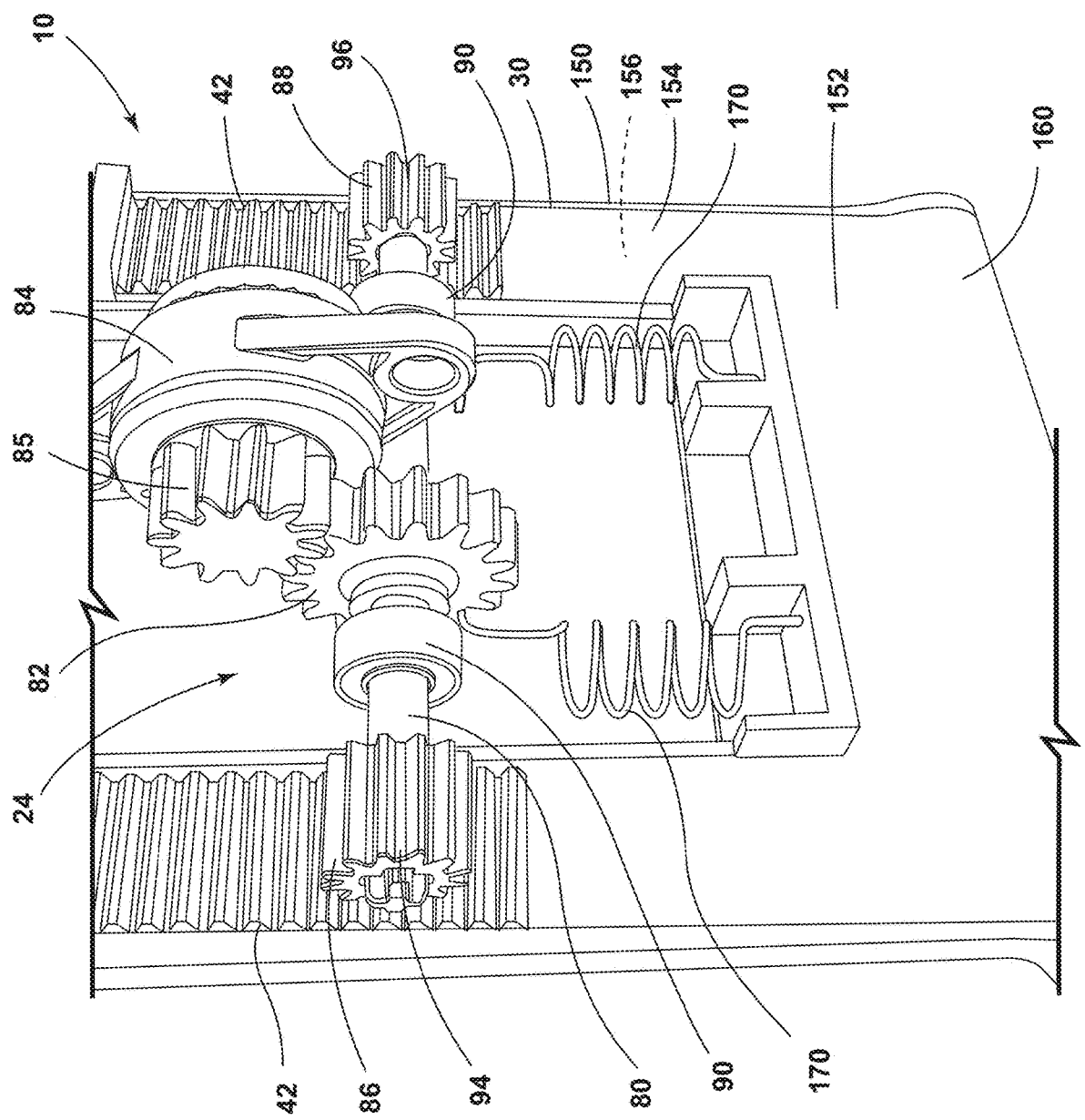
FIG. 8 is an enlarged, front partial view of a second leg, drive assembly, and engagement spring of the device holder assembly, according to one example.

Referring further to FIGS. 3-8, the drive assembly 24 may include a bearing 90 coupled to the drive shaft 80. In some embodiments, the drive assembly 24 may include a plurality of bearing 90, such as a first bearing 90 coupled to the drive shaft 80 and proximate the first gear 82 and a second bearing 90 coupled to the drive shaft 80 and distal to the first gear 82. In yet other embodiments, the first bearing 90 and the second bearing 90 may be coupled the drive shaft 80 and may be coupled to the housing 20. For example, the first bearing 90 and the second bearing 90 may be coupled to the housing 20 via integrally formed bearing rests 92 that extend upward from the housing rear portion 70, as illustrated in FIG. 8. The bearing 90 may be a plain bearing, roller bearing, ball bearing, or another suitable bearing.

Referring further to FIGS. 4-8, the drive assembly 24 may include a damper 84 coupled to the drive assembly 24. In some configurations, the damper 84 has a second gear 85. As illustrated in FIG. 8, the second gear 85 is proximate and mechanically coupled to the first gear 82. According to various embodiments, the damper 84 is configured to reduce rotational movement and rotational speed of the drive assembly 24. In some embodiments, the reduction in rotational movement and of the drive assembly 24 is dictated by the type of damper 84 used and the gear teeth ratio between the first gear 82 and the second gear 85. For example, the damper 84 may be a bi-directional plastic rotary damper and the gear ratio may comprise the first gear 82 having sixteen teeth (input gear) and the second gear 85 may have eleven teeth (output gear). It is generally contemplated that the damper 84 be a one of various dampers and the gear ratio may be any suitable ratio. Additionally, or alternatively, it is generally contemplated that the drive assembly 24 may include numerous dampers, so long as the drive assembly 24 rotational movement and speed can be reduced.

Referring again to FIGS. 4-8, the drive assembly 24 includes the third gear 86 and the fourth gear 88. As illustrated in FIG. 8, the third gear 86 may be coupled to a first end 94 of the drive shaft 80 and the fourth gear 88 may be coupled to an opposing, second end 96 of the drive shaft 80. The third gear 86 and the fourth gear 88 are coupled to the drive shaft 80, the first rack gear 40, and the second rack gear 42, as illustrated in FIGS. 4, 6. The third gear 86 and the fourth gear 88 may either be a spur gear or a helical gear. According to various embodiments, the third gear 86 and the fourth gear 88 are configured to mechanically engage the teeth of the first rack gear 40 and second rack gear 42 and to provide rotational movement of the drive assembly 24 and either the first leg 28 or the second leg 30. For example, if a user translates either the first leg 28 or the second leg 30 away from the housing 20, either the first rack gear 40 or the second rack gear 42 will drive the third gear 86 and the fourth gear 88. The third gear 86 and the fourth gear 88, in turn, cause the other of the first leg 28 and the second leg 30 to likewise translate away from the housing 20, while also driving a rotational movement of the drive shaft 80.

Referring to FIGS. 4-8, the device holder assembly 10 includes the leg assembly 26. The leg assembly 26 includes the first leg 28. The first leg 28 may further include a first leg lower portion 100 and a first leg upper portion 102, the first leg lower portion 100 and the first leg upper portion 102 generally intersecting at a first leg portion corner 104. The first leg upper portion 102 is elevated from the first leg lower portion 100. In some embodiments, the first leg lower portion 100 partially extends along a length of the housing 20 and defines a general U-shape having a top surface 106 and a bottom surface 108, as illustrated in FIGS. 4, 6. The first leg lower portion 100 top surface 106 generally faces towards the housing cover 110 and the first leg lower portion bottom surface 108 is generally proximate the housing rear portion 70.

The first leg 28 may be slideably coupled to the housing 20 via a first carriage and rails 120. According to various embodiments, the first carriage and rails 120 may be disposed on the housing rear portion 70 and coupled the first leg lower portion bottom surface 108.

As illustrated in FIGS. 3-6, the first leg 28 is operable between a recessed position 32 and an extended position 36. In the recessed position 32, the first leg 28 resides within the housing 20. In the extended position 36, first leg 28 translates out of the housing 20 such that the first leg upper portion 102 is partially translated out of the housing 20, as illustrated in FIGS. 5 and 6. Additionally, it is generally contemplated that the first leg extended position 36 comprises multiple extended positions 36, depending on the desired use and size of device 122.

Referring to FIGS. 3-7, the first leg 28 includes a first leg end segment 124. In some embodiments, the first leg end segment 124 is integrally coupled to the first leg upper portion 102. The first leg end segment 124 may include a first finger engagement member 126. In some embodiments, the first leg end segment 124 has a plurality of first finger engagement members 126 and a first leg end recess 128 defined between at least a pair of first finger engagement members 126. For example, as illustrated in FIG. 7, the first leg end segment 124 includes a pair of first finger engagement members 126 and a first leg end recess 128 defined between the pair of first finger engagement members 126. In some embodiments, the first finger engagement member 126 couples to the first finger 44 and permit a rotational movement of the first finger 44 about the first finger engagement member 126. In some configurations, the first leg end recess 128 is configured to receive additional components, such as a damper, spring, or gear, as provided herein. The first finger engagement member 126 may define a generally semi-circular shape, wherein the semi-circular shape defines a first finger engagement member arc 130 that coincides with an arc defined by the rear portion 132 of the first finger 44.

Referring to FIGS. 3-7, the first leg 28 includes a first rack gear 40. The first rack gear 40 is coupled to the first leg lower portion 100. For example, the first rack gear 40 may be coupled to the top surface 106 or the bottom surface 108 of the first leg lower portion 100. The first rack gear 40 may be integrally disposed on the first leg lower portion 100, as illustrated in FIG. 7. According to various embodiments, the first rack gear 40 engages and couples to the third gear 86 and the fourth gear 88 and either provides or receives a force to or from the third gear 86 or the fourth gear 88 as the first leg 28 translates. For example, as the first leg 28 translates to the extended position 36, the first rack gear 40 engages the third gear 86 and fourth gear 88, causing each 86, 88 to rotate and subsequently drive the drive shaft 80 and second leg 30.

Referring to FIG. 7, the first leg 28 includes the first leg travel stop 140 coupled to the first leg lower portion 100. In various embodiments, the first leg travel stop 140 at least partially limit the lateral translation of the first leg 28 and the second leg 30.

Referring now to FIGS. 3, 5-7, the leg assembly 26 includes the second leg 30. The second leg 30 may include a second leg lower portion 150 and a second leg upper portion 152 integrally coupled to the second leg lower portion 150. In some embodiments, the second leg lower portion 150 partially extends along the length of the housing 20 and defines a U-shape having a top surface 154 and a bottom surface 156. The second leg lower portion top surface 154 is proximate the housing cover 110 or the body 16 and may couple to the second carriage and rails 158. The second leg lower portion bottom surface 156 is generally proximate the drive assembly 24.

In some embodiments, the second leg 30 is be slideably coupled to the housing 20 via the second carriage and rails 158. The second carriage and rails 158 may be coupled to the housing cover 110, as illustrated in FIGS. 4, 6 and 7, or to the body 16.

Referring to FIGS. 3-6, the second leg 30 is operable between a recessed position 34 and an extended position 38. In the recessed position 34, the second leg 30 may reside within the housing 20. In the extended position 38, the second leg 30 at least partially translates out of the housing 20, as illustrated in FIGS. 5 and 6. Additionally, it is generally contemplated that the second leg extended position 38 comprises multiple positions, depending on use and device 122 size.

Referring to FIGS. 4-7, the second leg 30 may include a second leg end segment 160. In some embodiments, the second leg end segment 160 may be integrally coupled to the second leg upper portion 152. The second leg end segment 160 may include a second finger engagement member 162. In some embodiments, the second leg end segment 160 may include a plurality of second finger engagement members 162 and a second leg end recess 164 defined between second finger engagement members 162. For example, as illustrated in FIG. 7, the second leg end segment 160 includes a pair of second finger engagement members 162 and a second leg end recess 164 defined between the pair of second finger engagement members 162. In some embodiments, the second finger engagement member 162 is configured to couple to the second finger 46 and permit a rotational movement of the second finger 46 about the second finger engagement member 162. The second leg end recess 164 may receive additional components, as provided herein. Additionally, the second finger engagement member 162 may define a generally semi-circular shape having a second finger engagement member arc 166 that coincides with an arc defined by the rear portion 168 of the second finger 46.

Referring to FIGS. 4, 6-8, the second leg 30 includes a second rack gear 42. The second rack gear 42 is coupled to the second leg lower portion 150. The second rack gear 42 may be disposed on the bottom surface 156 of the second leg lower portion 150, as illustrated in FIGS. 7 and 8. According to some embodiments, the second rack gear 42 couples to the third gear 86 and fourth gear 88. The second rack gear 42 either provides or receives a force to or from the third gear 86 and fourth gear 88 as the second leg 30 translates. For example, as the second leg 30 translates to the extended position 38, the second rack gear 42 engages the third gear 86 and fourth gear 88, causing rotation of the drive assembly 24 and linear translation of the first leg 28.

It is generally contemplated that the second rack gear 42 may or may not have generally the same length, number of gear teeth, teeth thickness, teeth depth, linear pitch, and other gear measurements as the first rack gear 40. If the gears 40, 42 mirror each other, synchronized translation of the first leg 28 and second leg 30 occurs. If not, non-synchronized translation may occur. For example, if first leg 28 translation space is limited, the second rack gear 42 may be construed such that the second leg 30 translates at a faster rate than the first leg 28.

Referring to FIGS. 4-8, the leg assembly 26 may include an extension spring 170. In some embodiments, the extension spring 170 is coupled to the first leg 28 or second leg 30. The leg assembly 26 may include multiple extension springs 170. The extension spring 170 provides a force that biases the first leg 28 and second leg 30 toward the recessed position 32, 34 wherein the force is generally parallel to the linear translation of the first leg 28 and second leg 30.

As illustrated in FIG. 7, the leg assembly 26 may include a first hinge cover 172 and a second hinge cover 174. The first hinge cover 172 couples to the first finger engagement member 126 and the second hinge cover 174 couples to the second finger engagement member 162. The first hinge cover 172 and the second hinge cover 174 may have a semi-circular shape, the semi-circular shape defining a first hinge cover arc 176 and a second hinge cover arc 178 that generally correspond and are generally parallel with the first finger engagement member arc 130 and the second finger engagement member arc 166, as provided herein. The first hinge cover 172 and the second hinge cover 174 cover the first finger engagement member 126, the second finger engagement member 162, and additional components, such as a rotary spring, damper, or gear.

Referring to FIGS. 1-7 and 9-11 the device holder assembly 10 includes a first finger 44. The first finger 44 may be rotatably coupled to the first finger engagement member 126. The first finger 44 may include a rear portion 132, a top portion 180 extending from and coupled to the rear portion 132, an engagement portion 182 opposing the top portion 180 and defined on an interior of the first finger 44, and a first finger outer surface 56 extending along the rear portion 132 and the top portion 180, as illustrated in FIGS. 3-7. In some configurations, the rear portion 132 is at an end of the first finger 44 and generally defines a semi-circular shape with an arc that coincides with the first finger engagement member arc 130.

The first finger 44 is operable between a retracted position 48 and a deployed position 52. In the retracted position 48, the first finger 44 is rotated vehicle-downward and the engagement portion 182 and top portion 180 of the first finger 44 are generally parallel with the first leg lower portion top surface 106, and the first finger outer surface 56 is generally parallel with the body outer surface 18 and the bridge 22, such that the first finger outer surface 56 is generally flush with the body outer surface 18 and the bridge 22. In the deployed position 52, the first finger 44 is rotated outward such that the engagement portion 182 and the top portion 180 are generally perpendicular with the body outer surface 18. As illustrated in FIGS. 1 and 2, a device 122 may contact the engagement portion 182 and be at partially retained by the engagement portion 182 when the first finger 44 is in the deployed position 52.

Referring to FIGS. 1-7 and 9-11 the first finger 44 includes a first finger lip 190 coupled to the first finger top portion 180 and/or engagement portion 182. The first finger lip 190 may be integrally formed into an end of the top portion 180. As illustrated in FIGS. 3-7, the first finger 44 may include a plurality of first finger lips 190, such as a pair of first finger lips 190. The first finger lip 190 provides a retaining force that at least partially secures the device 122 when the first finger 44 is in the deployed position 52. The first finger lip 190 engages a retaining element 200 defined on the housing cover 110 when the first finger 44 is in the retracted position 48, the engagement between the first finger lip 190 and the retaining element 200 providing a retaining force that at least partially keeps the first leg 28 in the recessed position 32.

Referring to FIGS. 1-7 and 9-11, the device holder assembly 10 includes a second finger 46. The second finger 46 may be rotatably coupled to the second finger engagement member 162. The second finger 46 includes a rear portion 168, a top portion 210 extending from and coupled to the rear portion 168, an engagement portion 212 opposing the top portion 210 and defined on an interior of the second finger 46, and a second finger outer surface 58 extending along the rear portion 168 and top portion 210 of the second finger 46. In some configurations, the second finger rear portion 168 is at an end of the second finger 46 and defines a semi-circular shape with an arc that coincides with the second finger engagement member arc 166.

As illustrated in FIGS. 1-6 and 9-11, the second finger 46 is operable between the retracted position 50 and the deployed position 54. In the retracted position 50, the second finger 46 is rotated vehicle-downward such that the engagement portion 212 and top portion 210 of the second finger 46 are generally parallel with the second leg lower portion top surface 154, and the second finger outer surface 58 is generally parallel with the body outer surface 18 and bridge 22, such that the second finger outer surface 58 is generally flush with the body outer surface 18 and bridge 22. In the deployed position 54, the second finger 46 is rotated outward and the engagement portion 212 and top portion 210 of the second finger 46 are perpendicular with the body outer surface 18. As illustrated in FIG. 1, a device 122 may contact the second finger engagement portion 212 and be at least partially retained by the second finger engagement portion 212 when the second finger 46 is in the deployed position 54.

Additionally, the device holder assembly 10 may include additional fingers, such as a third finger. For example, the third finger may be coupled and operably deployable from the bridge 22, wherein the deployment of the third finger provides the securing of the device 122 either between the first finger 44 and the third finger, or the second finger 46 and the third finger. Moreover, such configurations would be beneficial if the device 122 is lesser in size, wherein the lesser size prevents securement between the first finger 44 and the second finger 46.

Referring to FIGS. 1-7 and 9-11, the second finger 46 includes a second finger lip 220 coupled to or formed into an end of the second finger top portion 210 and/or engagement portion 212. As illustrated in FIGS. 3-7, the second finger 46 may include a plurality of second finger lips 220 such as a pair of second finger lips 220. The second finger lip 220 provides a retaining force that partially secures the device 122 when the second finger 46 is in the deployed position 54. The second finger lip 220 engages the retaining element 200 of the housing cover 110 when the second finger 46 is in the retracted position 50, the engagement between the second finger lip 220 and the retaining element 200 providing a retaining force that at least partially keeps the second leg 30 in the recessed position 34.

In some embodiments, a finger spring 230 may be coupled to the first finger 44 and second finger 46. Additionally, there may be a pair of fingers springs 230. For example, a first finger spring 230 may be coupled to the first finger 44 and a second finger spring 230 may be coupled to the second finger 46. The finger spring 230 may be a torsion spring. The finger spring 230 provides a rotational biasing force on the first finger 44 and second finger 46 that directs the first finger 44 and the second finger 46 toward the retracted position 48, 50.

Referring to FIGS. 5-7, a finger damper 232 may be coupled to the first finger 44 and second finger 46. In some embodiments, a first finger damper 232 is coupled to the first finger 44 and a second finger damper 232 coupled to the second finger 46. The first finger damper 232 may be housed in the first leg end recess 128 and the second finger damper 232 may be housed in the second leg end recess 164. The finger damper 232 reduces the rotational movement and the rotational speed of the first finger 44 and second finger 46 as they move from the deployed position 52, 54 to the retracted position 48, 50. For example, the finger damper 232 reduces the rotational movement of the first finger 44, as caused by the finger spring 230, as it moves to the retracted position 48.

Referring to FIGS. 5-7, the device holder assembly 10 may include a finger pad 234. The finger pad 234 may be coupled to the engagement portions 182, 212 of the first finger 44 and/or second finger 46. In some embodiments, there may be a plurality of finger pads 234, such as a first finger pad 234 coupled to the first finger engagement portion 182 and a second finger pad 234 may be coupled to the second finger engagement portion 212. The finger pad 234 provides a cushion on the engagement portions 182. 212 such that retaining element 200 contact is dampened when the first finger 44 and second finger 46 are rotated to the retracted position 48, 50. The finger pad 234 also dampens impact and provides a retaining force between the device 122 and the engagement portions 182, 212 of the first finger 44 and the second finger 46. Additionally, the finger pad 234, in some embodiments, may define a plurality of ridges, the plurality of ridges being configured to engage an edge of the device 122.

Referring now to FIGS. 1-7, the device holder assembly 10 includes a housing cover 110 coupled to the housing 20. The housing cover 110 may be coupled to the housing 20 and to the bridge 22, as illustrated in FIGS. 1 and 2. In some embodiments, the housing cover 110 defines a generally rectangular shape, wherein the size and rectangular shape of the housing cover 110 generally corresponds with the size and rectangular shape of the housing 20. The housing cover 110 covers at least a portion of the housing 20 and allows for coupling to the second carriage and rails 158. It is also generally contemplated that the housing cover 110 may be integrally formed into the body 16 or bridge 22. For example, the housing cover 110 may be integrally formed into the bridge 22, such that the second carriage and rails 158 is coupled to the bridge 22.

Referring further to FIGS. 1-3 and 5, the housing cover 110 includes the retaining element 200. The retaining element 200 may be disposed on and protruding from the housing cover 110. In other embodiments, the retaining element 200 may be disposed on a front surface 240 of the housing cover 110 and proximate the first finger 44 and second finger 46. The housing cover 110 may include a first retaining element 200 proximate the first finger 44 and a second retaining element 200 proximate the second finger 46. The retaining element 200, in some configurations, has a height 242 that generally corresponds with the height of the first finger 44 and/or second finger 46, the correspondence ensuring that the first finger lip 190 and second finger lip 220 contact the retaining element 200 when the first finger 44 and second finger 46 are in the retracted position 48, 50. The retaining element 200 receives and operably couples to the first finger lip 190 and second finger lip 220 when the first finger 44 and second finger 46 are in the retracted position 48, 50, wherein the operable coupling of the first finger lip 190 and second finger lip 220 to the retaining element 200 provides a retaining force that at least partially keeps the first leg 28 and second leg 30 in the recessed position 32, 34 when not in use.

Figure 11:
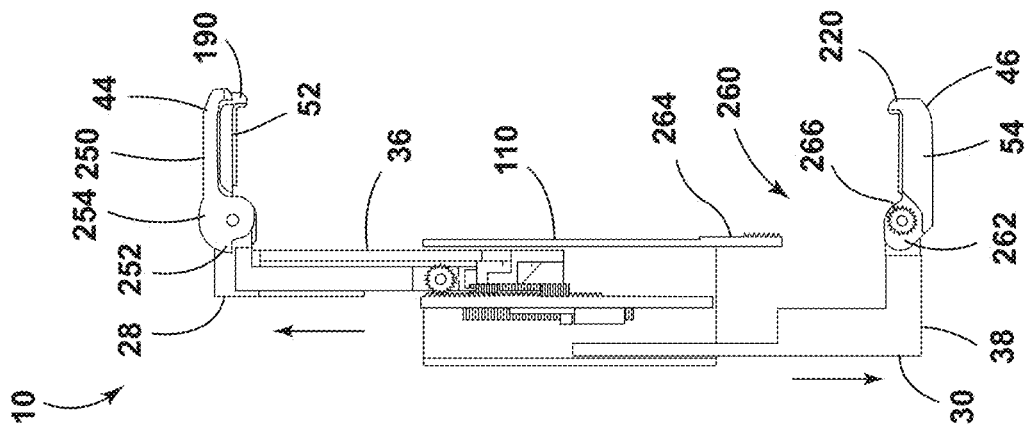
FIG. 11 is a side partial view of the device holder assembly of FIG. 10 in the use position, according to one example.
Figure 10:
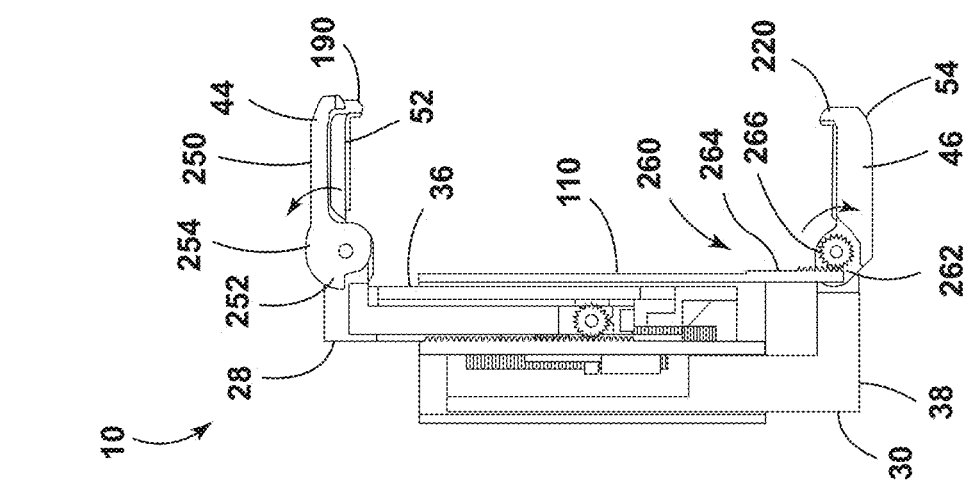
FIG. 10 is a side partial view of a first finger and a second finger of the device holder assembly of FIG. 9 being in a deployed position, according to one position.
Figure 9:
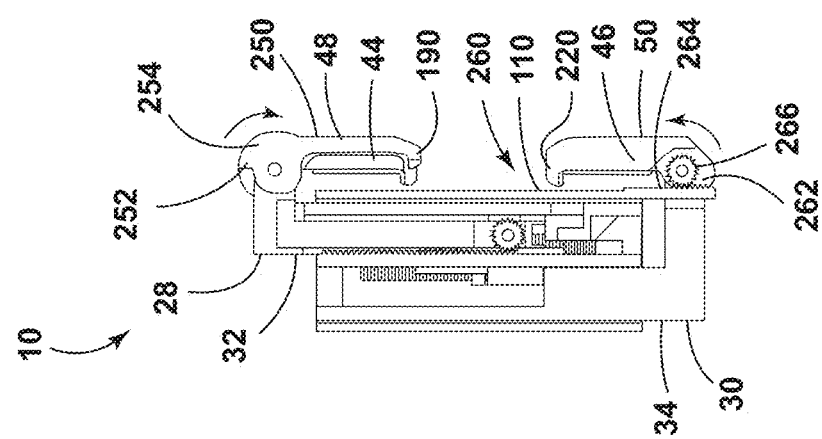
FIG. 9 is a side partial view of a device holder assembly in the non-use position, according to one example.

Referring to FIGS. 9-11, the device holder assembly 10 may include a locking lever 250. The locking lever 250 may be proximate the first finger 44 or second finger 46 and may be coupled to the first leg 28 or second leg 30. As illustrated in FIGS. 9-11, the locking lever 250 is coupled to the first leg end segment 124. The locking lever 250 includes a cam interface 252 on a locking lever rear segment 254. The locking lever 250 may be rotated downward from an inactive condition to an active condition once the device 122 is positioned between the first finger 44 and second finger 46. The locking lever 250, while being rotated downward, provides a squeezing force on the first finger 44, the second finger 46, the first leg 28, and/or the second leg 30, via the cam interface 252.

Referring to FIGS. 9-11, the device holder assembly 10 may include a second finger rack and pinion drive 260. The second finger rack and pinion drive 260 includes a second finger gear 262 and a second finger rack 264. The second finger gear 262 may be coupled to the second finger 46 and disposed within the second leg end recess 164 and the second finger rack 264 may be coupled to the first leg lower portion top surface 106 and/or the housing cover 110. The second finger rack and pinion drive 260 provides an automated opening of the second finger 46. For example, a user, after moving the first finger 44 to the deployed position 52, extends the first leg 28 and second leg 30 to the extended position 36, 38, the second finger rack 264 engages the second finger gear 262, causing rotational movement of the second finger 46 from the retracted position 50 to the deployed position 54. Additionally, the second finger rack and pinion drive 260 may include a deployment spring 266 coupled to the second finger 46, the deployment spring 266 being configured to keep the second finger 46 in the deployed position 54.

In operation of an exemplary embodiment of the device holder assembly 10, the device holder assembly 10 may initially be in a non-use position. In the non-use position, the first leg 28 and the second leg 30 will be in the recessed position 32, 34 and stored within the housing 20. Further, in the non-use position, the first finger 44 and second finger 46 will be in the retracted position 48, 50 and the first finger lip 190 and the second finger lip 220 will be operably coupled to the retaining element 200. Further still, the drive assembly 24 will be in a static condition and the extension spring 170 will be in a low-strain condition and the finger spring 230 will be applying a rotational force that at least partially keeps the first finger 44 and the second finger 46 in the retracted position 48, 50. The non-use position of the device holder assembly 10 can be illustrated in FIG. 2.

A user desiring to use the device holder assembly 10 may grab the second finger 46 and rotate the second finger 46 from the retracted position 50 to the deployed position 54.

As the second finger 46 rotates to the deployed position 54, the second finger spring 230 tensions and provides an opposing rotational force on the second finger 46. After the second finger 46 is in the deployed position 54, the user may linearly translate the second leg 30 along the second carriage and rails 158 from the recessed position 34 to the desired extended position 38. As the user translates the second leg 30 to the extended position 38, the second rack gear 42 drives the third gear 86 and the fourth gear 88, which in turn drive the first rack gear 40, resulting in an instantaneous translation of the first leg 28 along the first carriage and rails 120.

Once the first leg 28 and second leg 30 are in the extended position 36, 38 and the second finger 46 is in the deployed position 54, the user may then insert and place a bottom edge of the device 122 against the second finger lip 220 and on the second finger pad 234 that is coupled to the second finger engagement portion 212. Next, the user may grab and pivot the first finger 44 from the retracted position 48 to the deployed position 52. As the first finger 44 pivots to the deployed position 52, the first finger spring 230 tensions and provides an opposing, biasing force. After the first finger 44 is in the deployed position 52, the user may insert a top edge of the device 122 against the first finger lip 190 and on the first finger pad 234. The device holder assembly 10 is then in the use position and the user may release their hold on the first finger 44.

While the device holder assembly 10 is in the use position, a securing force is acted upon the device 122. The first finger 44 and the second finger 46 provide a compressing spring force via the first finger spring 230 and the second finger spring 230. Next, the first finger lip 190, the second finger lip 220, the first finger pad 234, and the second finger pad 234 provide a retaining force. Then, the extension spring 170 provides a compressing force on the device 122.

A user, desiring to remove the device 122 and return the device holder assembly 10 to the non-use position, may first grab the first finger 44 and remove the top edge of the device 122 away from the first finger 44. The user may then release the first finger 44, where the biasing force caused by the first finger spring 230 will cause the first finger 44 to return to the retracted position 48 and to couple to the retaining element 200. As the first finger 44 rotates to the retracted position 48, the first finger damper 232 reduces the rotational speed of the first finger 44 until contact is made with the retaining element 200. Next, the user grab the second finger 46 and pull the device 122 away from the second finger 46. The user may then release the second finger 46. The second finger 46, via the biasing force caused by the second finger spring 230, will then rotate from the deployed position 54 to the retracted position 50. As the second finger 46 rotates to the retracted position 50, the second finger damper 232 reduces the rotational speed of the second finger 46 until contact is made with the retaining element 200. While the second finger 46 moves to the retracted position 50, a biasing force by the extension spring 170 will cause the second leg 30 to translate from the extended position 38 to the recessed position 34. As the second leg 30 translates to the recessed position 34, the second rack gear 42 drives the third gear 86 and fourth gear 88 of the drive assembly 24, which in turn drive the first rack gear 40, resulting in the first leg 28 translating to the recessed position 32. Further, the damper 84, via the coupling between the first gear 82 and the second gear 85, will reduce the translation speed of the first leg 28 and second leg 30 as each translate to the recessed position 32, 34. Once the first leg 28 and the second leg 30 are in the recessed position 32, 34, the device holder assembly 10 is back to the non-use position.

Use of the presently disclosed device may provide for a variety of advantages. For example, the housing 20 may be coupled to various bodies 16, such as a vehicle seat 64, side panel, or instrument panel of a vehicle. Moreover, the various bodies 16 capable of coupling to the housing 20 provide a minimized footprint for the device holder assembly 10 and an increase in useable space that would otherwise be taken up by a conventional device holder assembly. Further, the variable linear translation of the first leg 28 and the second leg 30 of the device holder assembly 10 also provides for adaptive securing of various devices 122. For example, one device holder assembly 10 first leg 28 and second leg 30 may be translated outward to a greater degree for a larger device 122, such as a tablet, while another device holder assembly 10 first leg 28 and second leg 30 may be translated outward to a lesser degree for a smaller device 122.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably connected" or "operably coupled" to each other to achieve the desired functionality. Some examples of operably couplable include, but are not limited to, physically mateable and/or physically interacting components and/or wirelessly interactable and/or wirelessly interactable components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, wherein is defined by the following claims, as interpreted according to the principles of patent law, including the doctrine of equivalents.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A device holder assembly for a vehicle comprising:
   a body having a body outer surface;
   a housing coupled to the body;
   a drive assembly rotatably coupled to the housing, wherein the drive assembly further comprises:
      a drive shaft;
      a first gear coupled to the drive shaft;
      a damper having a second gear, the second gear being mechanically coupled to the first gear;
      a third gear coupled to an end of the drive shaft; and
      a fourth gear coupled to an opposing end of the drive shaft;
   a leg assembly coupled to the housing, the leg assembly comprising a first leg and a second leg, wherein the first leg and the second leg are movable between a recessed position and an extended position;
   a first rack gear coupled to the first leg, wherein the first rack gear is mechanically coupled to the drive assembly;
   a second rack gear coupled to the second leg, wherein the second rack gear is mechanically coupled to the drive assembly, and wherein the mechanical coupling between the first rack gear and the drive assembly and the second rack gear and the drive assembly permits movement of either the first leg or the second leg to the extended position as the other of the first leg or the second leg is translated to the extended position; and
   a first finger rotatably coupled to an end of the first leg and a second finger rotatably coupled to an end of the second leg, the first finger and the second finger being movable between a retracted position and a deployed position, wherein the first finger has a first finger outer surface and the second finger has a second finger outer surface that are generally coplanar with the body outer surface when the first finger and the second finger are in the retracted position.

2. The device holder assembly of claim 1, wherein the first leg and the second leg linearly translate from the recessed position to the extended position.

3. The device holder assembly of claim 1, further comprising a first finger damper coupled to the first finger and a second finger damper coupled to the second finger.

4. The device holder assembly of claim 3, further comprising a first finger spring coupled to the first finger and a second finger spring coupled to the second finger, wherein the first finger spring provides a biasing force that pulls the first finger toward the retracted position of the first finger, and wherein the second finger spring provides a biasing force that pulls the second finger toward the retracted position of the second finger.

5. The device holder assembly of claim 4, wherein the first leg comprises a first leg upper portion that is coupled to a first leg end segment that includes a pair of first finger engagement members, and wherein the pair of first finger engagement members have a substantially semi-circular shape, and wherein the second leg comprises a second leg upper that is coupled to a second leg end segment that includes a pair of second finger engagement members, the pair of second finger engagement members having a substantially semi-circular shape.

6. The device holder assembly of claim 5, wherein the pair of first finger engagement members are rotatably coupled to the first finger and the pair of second finger engagement members are rotatably coupled to the second finger.

7. The device holder assembly of claim 5, wherein the first leg upper portion generally intersects with a first leg lower portion at a first leg portion corner, and wherein the first leg upper portion is elevated from the first leg lower portion.

8. The device holder assembly of claim 1, further comprising a housing cover coupled to a front section of the housing.

9. The device holder assembly of claim 8, further comprising a first finger lip at an end of the first finger and a second finger lip at an end of the second finger, wherein the first finger lip and the second finger lip provide a retaining force at least partially sufficient to secure a device when the first finger and the second finger are in the deployed position, and wherein the first finger lip and the second finger lip engage a retaining element that is disposed on the housing cover when the first finger and the second finger are in the retracted position and the first leg and the second leg are in the recessed position.

10. A device holder assembly for a vehicle comprising:
    a body having a body outer surface;
    a housing recessed into the body and coupled to the body;
    a bridge extending over a width of the housing, the bridge being integrally formed from the body;
    a housing cover coupled to a front section of the housing, the housing cover including a retaining element disposed on a front surface of the housing cover;
    a drive assembly rotatably coupled to the housing;
    a leg assembly coupled to the housing and to the drive assembly, the leg assembly comprising a first leg and a second leg, wherein the first leg and the second leg are movable between a recessed position and an extended position;
    a first rack gear coupled to the first leg, wherein the first rack gear is mechanically coupled to the drive assembly;
    a second rack gear coupled to the second leg, wherein the second rack gear is mechanically coupled to the drive assembly, and wherein the mechanical coupling between the first rack gear and the drive assembly and the second rack gear and the drive assembly permits movement of either the first leg or the second leg to the extended position as the other of the first leg or the second leg is translated to the extended position; and
    a first finger rotatably coupled to an end of the first leg and a second finger rotatably coupled to an end of the second leg, the first finger and the second finger being movable between a retracted position and a deployed position, wherein the first finger has a first finger outer surface and the second finger has a second finger outer surface that are generally coplanar with the body outer surface when the first finger and the second finger are in the retracted position.

11. The device holder assembly of claim 10, wherein the drive assembly further comprises:
    a drive shaft;
    a first gear coupled to the drive shaft;
    a damper having a second gear, the second gear being mechanically coupled to the first gear;
    a third gear coupled to an end of the drive shaft; and
    a fourth gear coupled to an opposing end of the drive shaft.

12. The device holder assembly of claim 10, wherein the first leg and the second leg linearly translate from the recessed position to the extended position.

13. The device holder assembly of claim 10, further comprising a first finger damper coupled to the first finger and a second finger damper coupled to the second finger.

14. The device holder assembly of claim 10, further comprising a first finger spring coupled to the first finger and a second finger spring coupled to the second finger, wherein the first finger spring provides a biasing force that pulls the first finger toward the retracted position of the first finger, and wherein the second finger spring provides a biasing force that pulls the second finger toward the retracted position of the second finger.

15. The device holder assembly of claim 10, wherein the first leg comprises a first leg end segment that includes a pair of first finger engagement members that are rotatably coupled to the first finger and the second leg comprises a second leg end segment that includes a pair of second finger engagement members that are rotatably coupled to the second finger, and wherein the pair of first finger engagement members have a generally semi-circular shape and the pair of second finger engagement members have a generally semi-circular shape.

16. The device holder assembly of claim 15, further comprising a first hinge cover coupled to the pair of first finger engagement members and a second hinge cover coupled to the pair of second finger engagement members, wherein the first hinge cover has a first hinge cover arc that is generally parallel with a first finger engagement member arc of the pair of first finger engagement members and the second hinge cover has a second hinge cover arc that is generally parallel with a second finger engagement member arc of the pair of second finger engagement members.

17. A device holder assembly for a vehicle comprising:
a vehicle seat rear portion having a body outer surface;
a housing recessed into the vehicle seat rear portion and coupled to the vehicle seat rear portion;
a bridge extending over a width of the housing, the bridge being integrally formed from the vehicle seat rear portion;
a housing cover coupled to a front section of the housing, the housing cover including a retaining element disposed on the housing cover;
a drive assembly rotatably coupled to the housing;
a leg assembly coupled to the housing and to the drive assembly, the leg assembly comprising a first leg and a second leg, wherein the first leg and the second leg are movable between a recessed position and an extended position;
a first rack gear coupled to the first leg, wherein the first rack gear is mechanically coupled to the drive assembly;
a second rack gear coupled to the second leg, wherein the second rack gear is mechanically coupled to the drive assembly, and wherein the mechanical coupling between the first rack gear and the drive assembly and the second rack gear and the drive assembly permits movement of either the first leg or the second leg to the extended position as the other of the first leg or the second leg is translated to the extended position;
a first finger rotatably coupled to an end of the first leg and a second finger rotatably coupled to an end of the second leg, the first finger and the second finger being movable between a retracted position and a deployed position, wherein the first finger has a first finger outer surface and the second finger has a second finger outer surface that are generally coplanar with the body outer surface when the first finger and the second finger are in the retracted position; and
a first finger lip at an end of the first finger and a second finger lip at an end of the second finger, wherein the first finger lip and the second finger lip provide a retaining force at least partially sufficient to secure a device when the first finger and the second finger are in the deployed position, and wherein the first finger lip and the second finger lip engage a retaining element that is disposed on the housing cover when the first finger and the second finger are in the retracted position and the first leg and the second leg are in the recessed position.

18. The device holder assembly of claim 17, wherein the first leg and the second leg linearly translate from the recessed position to the extended position.

19. The device holder assembly of claim 17, further comprising a first finger damper coupled to the first finger and a second finger damper coupled to the second finger.

* * * * *